United States Patent [19]

Bell et al.

[11] Patent Number: 5,042,907
[45] Date of Patent: Aug. 27, 1991

[54] COATED OPTICAL FIBRES

[75] Inventors: Michael N. Bell, Macclesfield; Robert A. Head, Chester; Mark R. Paterson, Chester; Aidan P. J. Cadden, Chester; Graham R. Handley, Merseyside; Alan A. Sadler, Warrington, all of England

[73] Assignees: Imperial Chemical Industries, London, England; PLC and Fibres Optical, Clwyd, Wales

[21] Appl. No.: 358,792

[22] Filed: May 30, 1989

[30] Foreign Application Priority Data

May 28, 1988 [GB] United Kingdom ............ 8812804.6
Mar. 1, 1989 [GB] United Kingdom ............ 8904659.3

[51] Int. Cl.$^5$ .......................... G02B 6/10; G02B 6/00; B05D 5/06
[52] U.S. Cl. .................................... 385/123; 427/163
[58] Field of Search .................... 350/96.30–96.34; 427/54.1, 163

[56] References Cited

U.S. PATENT DOCUMENTS

| Re. 31,868 | 4/1985 | Beasley et al. | 350/96.34 |
| 4,324,453 | 4/1982 | Patel | 350/96.23 |
| 4,908,297 | 3/1990 | Head et al. | 427/54.1 X |

FOREIGN PATENT DOCUMENTS

| 2924495 | 1/1981 | Fed. Rep. of Germany . |
| 8403085 | 8/1984 | Fed. Rep. of Germany . |
| 0206234 | 7/1987 | Fed. Rep. of Germany . |

OTHER PUBLICATIONS

Chemical Abstracts, vol. 107, No. 2, Jul. 1987, p. 287, Abstract No. 11815y.
IEEE Journal on Selected Areas in Communications, vol. SAC-4, No. 5, Aug. 1986, pp. 691–692.

Primary Examiner—Akm Ullah
Attorney, Agent, or Firm—Cushman, Darby & Cushman

[57] ABSTRACT

A coated optical fibre assembly suitable for blowing through a microduct, said assembly comprising at least one optical fibre and having an external coating comprising a radiation-cured polymer containing particulate matter.

6 Claims, 1 Drawing Sheet

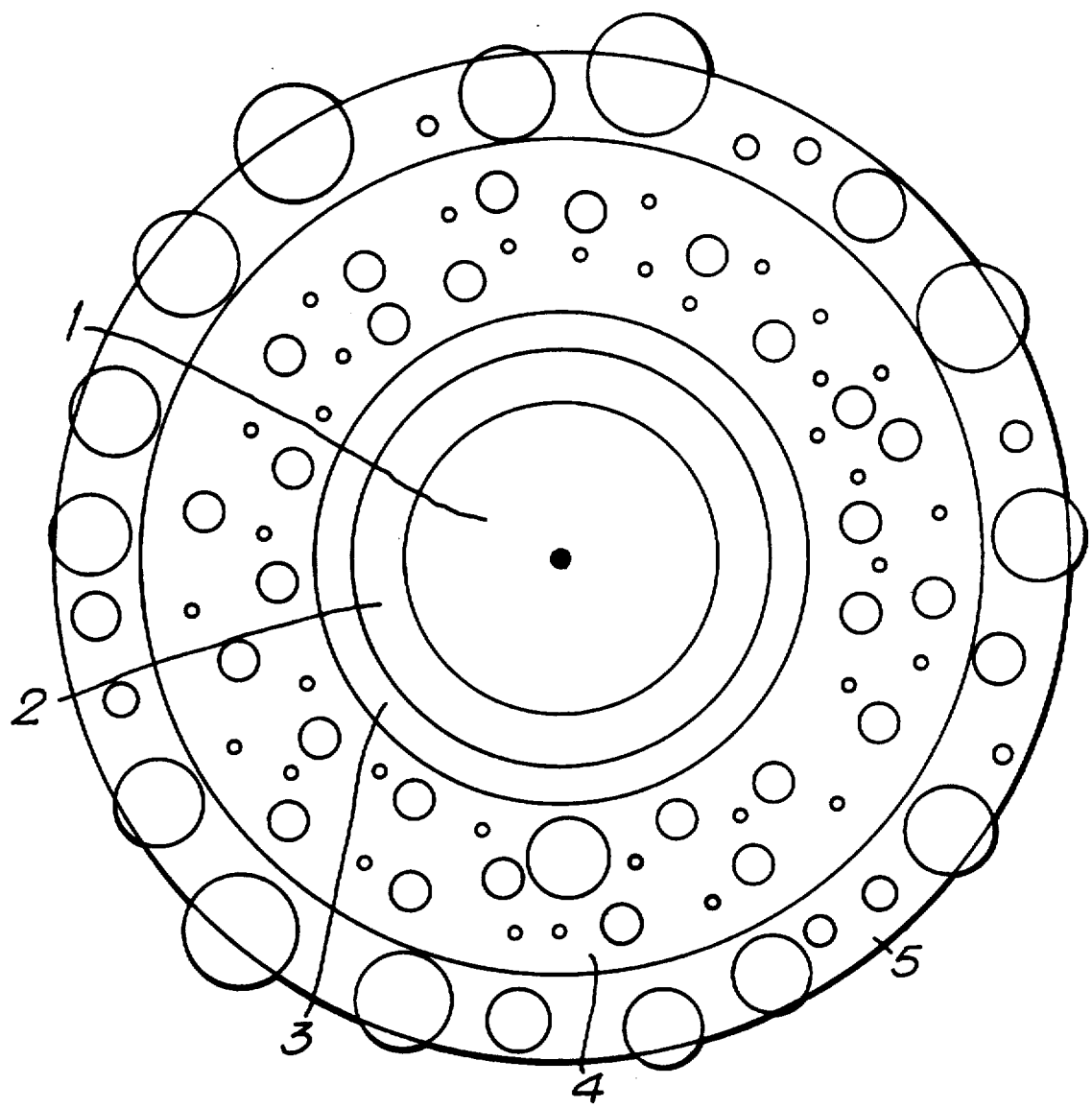

COATED OPTICAL FIBRES

This invention relates to coated optical fibres and to a method for their production.

BACKGROUND OF THE INVENTION

Coated optical fibres are widely used in the communications field because of their ability to carry large amounts of information over long distances. In order to protect the fibres from physical damage during installation and also from subsequent deterioration due to environmental agencies, it is conventional to apply protective coatings to the freshly drawn fibres as an integral part of the production process.

Because of the difficulty of providing all the required physical properties in a single coating, optical fibres are frequently provided with two coatings, a soft primary (inner) buffer coating having an ability to compensate for the effects of differential thermal expansion and a secondary (outer) high modulus coating providing the necessary toughness and resistance to abrasion and chemical attack.

The normal method of installation involves pulling the fibres along previously laid cable ducts with the aid of ropes, and to avoid damage, it is necessary to overjacket the fibres with an expensive cable system.

In order to avoid these problems, it has been proposed in EP-A-0108590 to propel the fibre along a tubular pathway by fluid drag of a gaseous medium passed through the pathway in the desired direction of advance. In other words, the fibres, usually in sheathed multiple bundles, are blown into place on a cushion of air. Using this technique it is possible to "blow" optical fibres along microducts for long distances (several kilometers) without damage.

Fibres suitable for blowing require packaging which is cheaper and simpler than normal cable structure. A number of designs are known; in EPA 157 610 a unit is described in which fibres are surrounded by an inner sheath and in turn an outer layer of lower density to confer blowability.

SUMMARY OF THE INVENTION

The present invention provides a coated optical fibre assembly comprising at least one optical fibre and having an external coating comprising a radiation-cured polymer containing particulate matter.

The coated assembly may contain a single buffered fibre, a plurality of fibres encapsulated in the polymer or a sheathed bundle of fibres.

The fibres themselves may be single or multimode and may include conventional silica glass fibres, polymer-clad silica fibres and polymer core fibres. These fibres (especially if containing silica) would normally be coated with a soft buffer and a hard coat prior to application of the external coating described herein. However, the use of other primary coating systems, such as a single coat, is not excluded.

The polymer providing the external coating of the coated optical fibre assembly of the invention may be any polymer which has been formed by the radiation-curing of a radiation-curable coating composition and which has appropriate properties for the purpose described. Thus, the polymer should be fully curable by the application of energy preferably of less than 2 $Jcm^{-2}$ using standard tower production speeds. The polymer should preferably have a modulus below 1500 MPa. Such polymers include vinyl polymers, for example acrylic polymers such as urethane-acrylate polymers.

The particulate matter present in the external coating suitably consists of microspheres which may be solid or hollow but particles having a more irregular structure may be used if desired.

By suitable selection of the particulate matter and its concentration in the external coating, it is possible to provide a significant reduction in the density of said coating and/or to provide the surface of the coating with indentations and/or protuberances because of the presence of the particulate matter.

Thus, one particularly valuable embodiment of the invention provides a coated optical fibre assembly comprising at least one optical fibre and having an external coating comprising a radiation-cured polymer containing hollow microspheres.

Hollow microspheres which may be present in the polymer may be made of glass or a polymeric material and suitably have average particle size (by volume) less than 100 microns, preferably less than 60 microns. The concentration of microspheres in the polymer is preferably such as to give an overall coating density at least 10% less than that of the polymer itself.

A further valuable embodiment of the invention provides a coated optical fibre assembly comprising at least one optical fibre and having an external coating comprising a radiation-cured polymer, the surface of said coating having indentations and/or protuberances due to the presence of particulate matter herein.

In this embodiment of the invention, the particulate matter present in the external coating suitably consists of microspheres which may be solid or hollow and are preferably made of a hard material having a low coefficient of friction, for example glass, although polymeric materials may also be used. In order to provide the surface of the external coating with the necessary indentations and/or protuberances, it is desirable that the average diameter of the microspheres is of the same order as the thickness of the coating, the particle size distribution of the microspheres preferably being narrow. As an alternative to microspheres, or in addition thereto, non-spherical particulate matter, for example polytetrafluoroethylene particles, may be used.

In the coated optical fibre assembly of the invention, the optical fibre may have one or more intermediate coatings in addition to the external coating. In particular, the assembly may include a conventional soft primary buffer coating and a secondary high modulus coating. Especially useful assemblies include a further buffer coating. This additional coating underlying the external coating minimises lateral stress on the waveguide core and preferably comprises a soft radiation-cured polymer which may be identical with that used for the external coating. The additional buffer coating may contain microspheres which should be softer than the microspheres or other particulate material present in the external coating.

DESCRIPTION OF THE DRAWINGS

In order that the invention may be clearly understood, one form thereof will now be described with reference to the accompanying drawing in which the single FIGURE shows in cross-section a coated optical fibre assembly of the invention in which the waveguide core 1 has a soft primary coating 2, a secondary coating 3, a soft tertiary coating 4 containing soft microspheres and an external coating 5 containing hard glass microspheres protruding through the surface.

The invention also provides a method of coating optical fibres which comprises the steps of:

(1) applying to an optical fibre, which may already have one or more coatings, a radiation-curable coating composition containing particulate matter and (2) subjecting the radiation-curable coating to electromagnetic radiation to effect its cure.

Radiation-curable coating compositions are well known in the art and typically comprise:

(a) a polyethylenically unsaturated oligomer, (b) an ethylenically unsaturated monomer which is a liquid solvent for the oligomer and is copolymerisable therewith, and (c) a photoinitiator composition.

DETAILED DESCRIPTION OF THE INVENTION

Examples of polyethylenically unsaturated oligomers which may be present in the radiation-curable coating compositions include unsaturated polyester resins, epoxy-acrylate resins and, especially, urethane-acrylate resins. Typical urethane-acrylate resins include reaction products of a polyol (for example a polyether polyol) an organic polyisocyanate (for example isophorone diisocyanate) and an ethylenically unsaturated monomer containing a single hydroxyl group (for example a hydroxyalkyl acrylate or methacrylate). the ratio of NCO groups in the polyisocyanate to OH groups in the polyol being greater than 1:1 and the ratio of total OH groups to NCO groups being at least 1:1.

Examples of ethylenically unsaturated monomers which may be present in the radiation-curable coating compositions are well known in the art and include esters of acrylic and methacrylic acids such as methyl methacrylate, isobornyl acrylate, phenoxyethyl acrylate, ethoxyethoxyethyl acrylate, butoxyethyl acrylate and butyl acrylate, acrylonitrile, methacrylonitrile, styrene, vinyl acetate and N-vinylpyrrolidone. It is often advantageous to include polyfunctional acrylate monomers such as ethylene glycol diacrylate or trimethylolpropane triacrylate.

The relative proportions of polyethylenically unsaturated oligomer and ethylenically unsaturated monomer in the radiation-curable coating compositions will depend upon the required viscosity of the compositions and the required properties of the cured product. Typical compositions contain 5 to 45, especially 10 to 30, parts by weight of unsaturated monomer per 100 total parts by weight of oligomer and monomer.

The photoinitiator composition present in the radiation-curable coating compositions may absorb visible or ultraviolet radiation. The photoinitiator composition may comprise, as the radiation-absorbing component thereof, conventional agents such as benzophenone and derivatives thereof, acetophenone and derivatives thereof, benzoin, benzil and benzil acetals. These photoinitiators may be used singly or in mixtures and are usually present in amounts of up to about 10% of the coating composition on a weight basis, especially from 2 to 6%. Amine accelerators such as methyldiethanolamine or diethylaminoethyl benzoate or polythiols may be included to enhance the cure.

The radiation-curable coating compositions (and the derived external coatings) suitably contain from 1 to 40% preferably from 5 to 30%, by volume of particulate matter. They may also contain other conventional ingredients of such compositions, for example flatting agents, slip agents, wetting agents, adhesion promoters, pigments or dyes and stabilisers.

The radiation-curable coating composition containing the microspheres or other particulate material may be applied to the optical fibre(s) by any conventional method. Preferably, a conventionally coated optical fibre or a plurality or bundle of such fibres is drawn through a bath containing the coating composition at a rate of about 1 to about 10 meters per second, to give a coating of between 25 and 200 microns.

Finally, the coating containing microspheres is subjected to electromagnetic radiation, for example ultraviolet radiation to cure the coating.

The coated optical fibre assemblies of this invention are particularly well adapted for installation by the blowing method described above. Fibre structures can be produced with transmission properties comparable with normal fibre optic cable. The process advantageously does not cause any constituent optical fibre to be subjected to undesirable levels of mechanical force, or to high temperatures, both of which can cause stress-related transmission losses. The coatings are easily removable, for measurements and for the mounting of splices and connectors, and have good environmental resistance.

The invention is illustrated but not limited by the following Examples in which the coating compositions and particulate additives used were as described below.

Three types of coating compositions have been used.

1. Low modulus: a urethane di-acrylate based on a linear polyether glycol was mixed with mono- and polyfunctional reactive diluents. This was then formulated with 3% of a suitable photo-initiator to yield a resin of the following properties:

| Properties of the Liquid | | |
|---|---|---|
| Viscosity (Poise) | @ 25° C. | 110 |
| | @ 30° C. | 66.8 |
| | @ 40° C. | 28.2 |
| Properties of the Cured Film | | |
| Tensile modulus (MPa) | | 61.2 |
| Secant Modulus @ 2.5% (MPa) | | 53.0 |
| Tensile Strength (MPa) | | 11.1 |
| Minimum Elongation (%) | | 56 |
| Shore Hardness (D) | | 41 |
| Water Uptake (%) | | 1.4 |
| Water Absorption (%) | | 1.6 |
| Extractables (%) | | 0.1 |

2. Mid Modulus: a mixture of urethane di-acrylate oligomers based on a polyether glycol and a polyether glycol of bis-phenol A were formulated with mono- and polyfunctional reactive diluents. This mixture was then formulated with 3% of a suitable photo-initiator to produce a resin of the following properties:

| Properties of the Liquid | | |
|---|---|---|
| Viscosity (Poise) | @ 25° C. | 104 |
| | @ 30° C. | 63.1 |
| | @ 40° C. | 25.4 |
| Properties of the Cured Film | | |
| Tensile modulus (MPa) | | 591 |
| Secant Modulus @ 2.5% (MPa) | | 518 |
| Tensile Strength (MPa) | | 24 |
| Minimum Elongation (%) | | 42 |
| Shore Hardness (D) | | 53 |
| Water Uptake (%) | | 3.1 |
| Water Absorption (%) | | 5.3 |

-continued

| | |
|---|---|
| Extractables (%) | 2.2 |

3. High Modulus: a mixture of urethane di-acrylate oligomers based on a polyether glycol and a polyether glycol of bis-phenol A were formulated with mono- and polyfunctional reactive diluents. This mixture was then formulated with 3% of a suitable photo-initiator to produce a resin of the following properties:

| Properties of the Liquid | | |
|---|---|---|
| Viscosity (Poise) | @ 25° C. | 94.9 |
| | @ 30° C. | 58.4 |
| | @ 40° C. | 23.2 |
| Properties of the Cured Film | | |
| Tensile modulus (MPa) | | 1011 |
| Secant Modulus @ 2.5% (MPa) | | 921 |
| Tensile Strength (MPa) | | 31 |
| Minimum Elongation (%) | | 25 |
| Shore Hardness (D) | | 72 |
| Water Uptake (%) | | 5.0 |
| Water Absorption (%) | | 4.9 |
| Extractables (%) | | 0.1 |

In addition, a low modulus buffer coating was used over the standard primary and secondary coatings as a tertiary layer below the quaternary layer containing the spheres/particles. No microspheres were added to this particular coating, although there is no reason that spheres could not be added to lower the density.

4. Low modulus buffer: a urethane di-acrylate based mono- and polyfunctional reactive diluents. This was then formulated with 3% of a suitable photo-initiator to yield a resin of the following properties:

| Properties of the Liquid | | |
|---|---|---|
| Viscosity (Poise) | @ 25° C. | 56.9 |
| | @ 30° C. | 37.9 |
| | @ 40° C. | 17.4 |
| Properties of the Cured Film | | |
| Tensile modulus (MPa) | | 15.4 |
| Secant Modulus @ 2.5% (MPa) | | 13.3 |
| Tensile Strength (MPa) | | 7.0 |
| Minimum Elongation (%) | | 80 |
| Water Uptake (%) | | 1.0 |
| Water Absorption (%) | | 0.9 |
| Extractables (%) | | −0.2 |

Microspheres/Particle Additives

The following microspheres and PTFE particles were added to the bases in varying amounts. Specific examples are listed below.

(a) polymeric hollow spheres ex Nobel Ind., Sweden
'Expancel 461DE20': average particle size 25 microns (by volume)

(b) glass hollow microspheres ex 3M, St Paul, Minn., USA
'Scotchlite E22/400': average particle size 35 microns (by volume)

(c) glass hollow microspheres ex Fillite (Runcorn) Ltd, Cheshire, UK.
'Fillite 300/7': average particle size 45 microns (by volume)

(d) PTFE particles ex ICI Advanced Materials, Welwyn Garden City, Herts, UK.
'Fluon L169': average particle size 16 microns (by volume)

EXAMPLE 1

To a sample of the low modulus coating (coating 1) was added 10% by volume 'Scotchlite E22/400' glass microspheres and the resulting coating mixed thoroughly to ensure homogeneity but without entrainment of air. A standard 250 micron dual-coated SM-02-R step index singlemode fibre, ex Optical Fibres, Deeside, Clwyd. was coated with this resin by drawing it through a bath containing the resin before curing using UV irradiation. The overall fibre diameter was 310 microns i.e. an outer coating thickness of 30 microns, and weight of 0.094 g/m.

The step attenuation (increase in attenuation due to application of the third coating) was 0.01 dB/km (1550 nm) and the increase in attenuation (1550 nm) on going to −10° C. was 0.08 dB/km. A 100 m length of this fibre took 47.6 seconds to blow through a 100 m length of polyethylene microduct tubing, inside diameter 3.5 mm, whilst a 1 m length took 39.1 seconds to blow through a 100 m tube.

EXAMPLE 2

To a sample of the mid-modulus coating (coating 2) was added 10% by volume of 'Expancel 461DE20' polymeric microspheres and the resulting coating mixed thoroughly. A standard 250 micron dual-coated SM-02-R step index singlemode fibre, ex Optical Fibres, Deeside, Clwyd, was coated with the resin, conventionally, before curing with UV irradiation. The overall diameter was 391 microns, and the weight 0.144 g/m.

The step attenuation was 0.05 dB/km (1550 nm) and the increase on going to −10° C. was 0.08 dB/km (1550 nm). Tests showed that this fibre was very resistant to microbending. A 1 m length of this fibre took 0.5 seconds to blow through a 100 m length of polyethylene microduct tubing of 3.5 mm inside diameter.

EXAMPLE 3

A dual coating was applied to a standard 250 micron dual-coated SM-02-R step index singlemode optical fibre, ex Optical Fibres, Deeside, Clwyd. The first of these coatings was the low modulus coating (coating 1) applied to a thickness of 70 microns. The topcoat was the low modulus coating with 30% by volume 'Expancel 461DE20' polymeric microspheres applied to give an overall diameter of 600 microns. and weight of 0.291 g/m.

The step attenuation was 0.03 dB/km (1550 nm) and the increase on going to −10° C. was 0.07 dB/km (1550 nm). In blowing tests, a one meter length of this fibre took 60.2 seconds to travel a 100 m length of polyethylene microduct tubing, 3.5 mm internal diameter.

EXAMPLE 4

A dual coating system was used that utilised the soft buffer (coating 4) as a tertiary layer to a thickness of 105 microns. This was overcoated with the low modulus coating (coating 1) containing 10% by volume 'Scotchlite E22/400' glass bubbles to produce a fibre with an outside diameter of 515 microns and weight of 0.240 g/m. For practical reasons, the fibre was spooled off between application of the two layers, although this could easily be carried out in one operation. The fibre used in this example was 250 micron dual-coated 50/125-01-R graded index multimode fibre, ex Optical Fibres, Deeside, Clwyd.

The step attenuation (850, 1300 nm) was 0.03 and 0.05 dB/km and the increase in attenuation at −10° C. (1300 nm) was 0.09 dB/km. In blowing tests, a one meter length of this fibre took 63.7 seconds to travel 100 m in a polyethylene tube. Also, a 100 m length of this fibre took 88.0 seconds to blow through a 100 m length of the same tube.

EXAMPLE 5

A dual coat system was applied to a 250 micron dual-coated SM-02-R step index singlemode fibre ex Optical Fibres, Deeside, Clwyd, with the low modulus coating (coating 1) as the tertiary layer, thickness 105 microns, and the low modulus coating (coating 1) containing 10% by volume 'Fillite 300/7' glass microspheres as the outer coating. The overall diameter of the fibre was 515 microns, and weight 0.244 g/m.

The step attenuation was 0.14 dB/km (at 1550 nms) and the attentuation increase at −10° C. was 0.15 dB/km (at 1550 nms). In blowing tests, a one meter length of this fibre took 39.0 seconds to 'blow' one hundred meters down a polyethylene microduct, internal diameter 3.5 mm. Also, a 100 m length of this fibre took 89.0 seconds to 'blow' through a 100 m length of polyethylene microduct.

EXAMPLE 6

A dual coating system was used comprising the low modulus coating (coating 1) as the tertiary layer, thickness 100 microns, and the high modulus coating (coating 3) containing 10% by volume 'Scotchlite E22/400' glass microspheres as the outer coating. The outside diameter was 370 microns. The fibre used for this example was 250 micron dual-coated 50/125-01-R graded index multimode fibre ex Optical Fibres, Deeside, Clwyd.

The step attenuation was 0.05 dB/km (850 nm), 0.04 dB/km (1300 nm) and the increase at −20° C. was 0.06 dB/km (850 nm), 0.07 dB/km (1300 nm). In blowing tests, a one meter length of this fibre took 39.4 seconds to travel a one hundred meter length of polyethylene tubing.

EXAMPLE 7

A dual coating system was applied to a 250 micron dual-coated 50/125-01-R graded index multimode optical fibre ex Optical Fibres, Deeside, Clywd. The tertiary layer, thickness 95 microns, was the low modulus coating (coating 1) and the outer coating was the high modulus coating (coating 3) containing 13.5% by weight 'Fluon L169' PTFE particles. The final diameter of the fibre was 370 microns.

The step attenuation was 0.11 dB/km (850 nm), 0.08 db/km (1300 nm) and the increase at −10° C. was 0.02 dB/km (850 nm), 0.05 dB/km (1300 nm). In blowing tests, a one meter length of this fibre took 42.2 seconds to travel a one hundred meter length of polyethylene microduct tubing.

What is claimed is:

1. A coated optical fibre assembly comprising at least one optical fibre and having an external coating comprising a radiation-cured polymer containing from 1 to 40% by volume of particulate matter selected from the class consisting of hollow microspheres having average diameters less than 100 microns and polytetrafluoroethylene particles.

2. A coated optical fibre assembly according to claim 1 wherein the microspheres have average diameters less than 60 microns.

3. A coated optical fibre assembly according to claim 7, wherein the external coating contains from 5 to 30% by volume of particulate matter.

4. A method of preparing a coated optical fibre assembly comprising at least one optical fibre and having an external coating comprising a radiation-cured polymer containing from 1 to 40% by volume of particulate matter, said process comprising the steps of:
   (1) applying to an optical fibre, a radiation-curable coating composition containing particulate matter selected from the class consisting of hollow microspheres having average diameters less than 100 microns and polytetrafluoroethylene particles, and
   (2) subjecting the radiation-curable coating so applied to electromagnetic radiation to effect its cure.

5. A method according to claim 4 wherein the radiation-curable coating composition further comprises:
   (a) a polyethylenically unsaturated oligomer,
   (b) an ethylenically unsaturated monomer which is a liquid solvent for the oligomer and is copolymerisable therewith, and
   (c) a photoinitiator composition.

6. A method according to claim 5 wherein the polyethylenically unsaturated oligomer is a urethane-acrylate resin.

* * * * *

UNITED STATES PATENT AND TRADEMARK OFFICE
CERTIFICATE OF CORRECTION

PATENT NO. : 5,042,907
DATED : August 27, 1991
INVENTOR(S) : BELL et al

It is certified that error appears in the above-identified patent and that said Letters Patent is hereby corrected as shown below:

On the face of the patent, in the Section designated "[73] Assignees" change "Fibres Optical" to -- Optical Fibres --.

Signed and Sealed this

Twenty-fifth Day of March, 1997

Attest:

BRUCE LEHMAN

Attesting Officer

Commissioner of Patents and Trademarks